US006254102B1

United States Patent
Vicory, Sr.

(10) Patent No.: US 6,254,102 B1
(45) Date of Patent: Jul. 3, 2001

(54) SEAL DEVICE HAVING A FLEXIBLE FINGER SEAL MEMBER

(75) Inventor: Jack L. Vicory, Sr., Naperville, IL (US)

(73) Assignee: McNish Corporation, Aurora, IL (US)

( * ) Notice: Subject to any disclaimer, the term of this patent is extended or adjusted under 35 U.S.C. 154(b) by 0 days.

(21) Appl. No.: 09/434,953

(22) Filed: Nov. 5, 1999

Related U.S. Application Data

(60) Provisional application No. 60/107,444, filed on Nov. 6, 1998.

(51) Int. Cl.[7] .................................................. F16J 15/36
(52) U.S. Cl. ............................ 277/390; 277/392; 277/394
(58) Field of Search .................................. 277/379, 385, 277/390, 391, 392, 393, 394, 399

(56) References Cited

U.S. PATENT DOCUMENTS

| | | | |
|---|---|---|---|
| 2,276,622 | * | 3/1942 | Leake . |
| 2,354,478 | * | 7/1944 | Reinhardt et al. . |
| 2,851,291 | * | 9/1958 | Payne . |
| 3,117,794 | * | 1/1964 | Wachal . |
| 3,179,425 | * | 4/1965 | Andresen . |
| 3,372,076 | * | 3/1968 | Wilkinson . |
| 3,511,513 | | 5/1970 | Dahlheimer . |
| 4,343,478 | * | 8/1982 | Morgan et al. . |
| 4,427,203 | * | 1/1984 | Escue . |
| 4,440,401 | | 4/1984 | Olschewski et al. . |
| 4,463,958 | * | 8/1984 | Butler . |
| 4,806,026 | | 2/1989 | Bauer et al. . |
| 4,832,511 | | 5/1989 | Nisley et al. . |
| 4,861,044 | | 8/1989 | Jay . |
| 4,943,068 | | 7/1990 | Hatch et al. . |
| 5,011,301 | | 4/1991 | Martinie . |
| 5,024,449 | | 6/1991 | Otto . |
| 5,188,377 | | 2/1993 | Drumm . |
| 5,332,235 | * | 7/1994 | Fone et al. . |
| 5,687,972 | * | 11/1997 | Petrak . |
| 6,039,320 | * | 3/2000 | MacDonald . |

* cited by examiner

Primary Examiner—James R. Brittain
Assistant Examiner—John L. Beres
(74) Attorney, Agent, or Firm—Lee, Mann, Smith, McWilliams, Sweeney & Ohlson

(57) ABSTRACT

A seal device for creating a seal between a rotatable shaft and a stationary member. The seal device includes a seal member having a generally annular body including a generally cylindrical inner wall forming a bore that extends through the body and a sealing surface adapted to rotatably and sealingly engage the stationary member. The body includes a generally annular flexible finger seal member having a base attached to the body and a generally circular peripheral tip that defines an aperture. The bore of the seal member and the aperture of the finger seal member are adapted to receive the shaft such that the tip of the finger seal member is in static sealing engagement with the shaft. A coupling member is adapted to attach the seal member to the shaft for conjoint rotation therewith and to resiliently bias the sealing surface of the seal member into rotating sealing engagement with the stationary member.

14 Claims, 3 Drawing Sheets

SEAL DEVICE HAVING A FLEXIBLE FINGER SEAL MEMBER

RELATED APPLICATIONS

This application claims the benefit of U.S. Provisional Application No. 60/107,444, filed Nov. 6, 1998.

BACKGROUND OF THE INVENTION

The present invention is directed to a seal device for creating a seal with a shaft, and in particular to a seal device having a generally circular and annular flexible finger seal member adapted to sealingly engage the shaft.

There has long been a need for a cost effective seal device to protect shafts, bearings, stuffing boxes and other parts from excessive wear due to abrasives. Abrasives quickly wear conventional fixed seals due to misalignment of the shaft and lineal movement due to changes in temperature. Long-line shafts in submerged slurrys, and other abrasive applications, have been particularly troublesome.

SUMMARY OF THE INVENTION

A seal device for creating a seal between a rotatable shaft and a stationary member such as a bearing. The seal device includes a seal member including a generally annular body having a first end and a second end. The body includes a generally cylindrical inner wall that forms a bore which extends through the body from the first end to the second end. The body includes a generally planar surface at the first end which is generally perpendicular to the bore and which is adapted to rotatably and sealingly engage the stationary member. The seal member also includes a generally annular flexible finger seal member at the first end of the body. The flexible finger seal is generally sheet-like and includes a base attached to the body and a generally circular peripheral tip which defines a generally circular aperture. The flexible finger seal member extends from the body inwardly toward the center of the body beyond the inner wall of the body. The body includes a generally circular groove that extends into the body from the inner wall. The groove is located adjacent the finger seal member. The base of the finger seal member is located adjacent the inner closed end of the groove. The base of the seal member and the aperture of the finger seal member are adapted to receive the shaft such that the tip of the finger seal is in static sealing engagement with the shaft. The seal member is removably attached to the shaft for conjoint rotation therewith by a coupling member. The coupling member is adapted to resiliently bias the sealing surface of the seal member into rotating engagement with the stationary member and thereby create a seal between the sealing surface of the seal member and the stationary member.

BRIEF DESCRIPTION OF THE DRAWING FIGURES

DETAILED DESCRIPTION OF THE PREFERRED EMBODIMENTS

Figure 1:
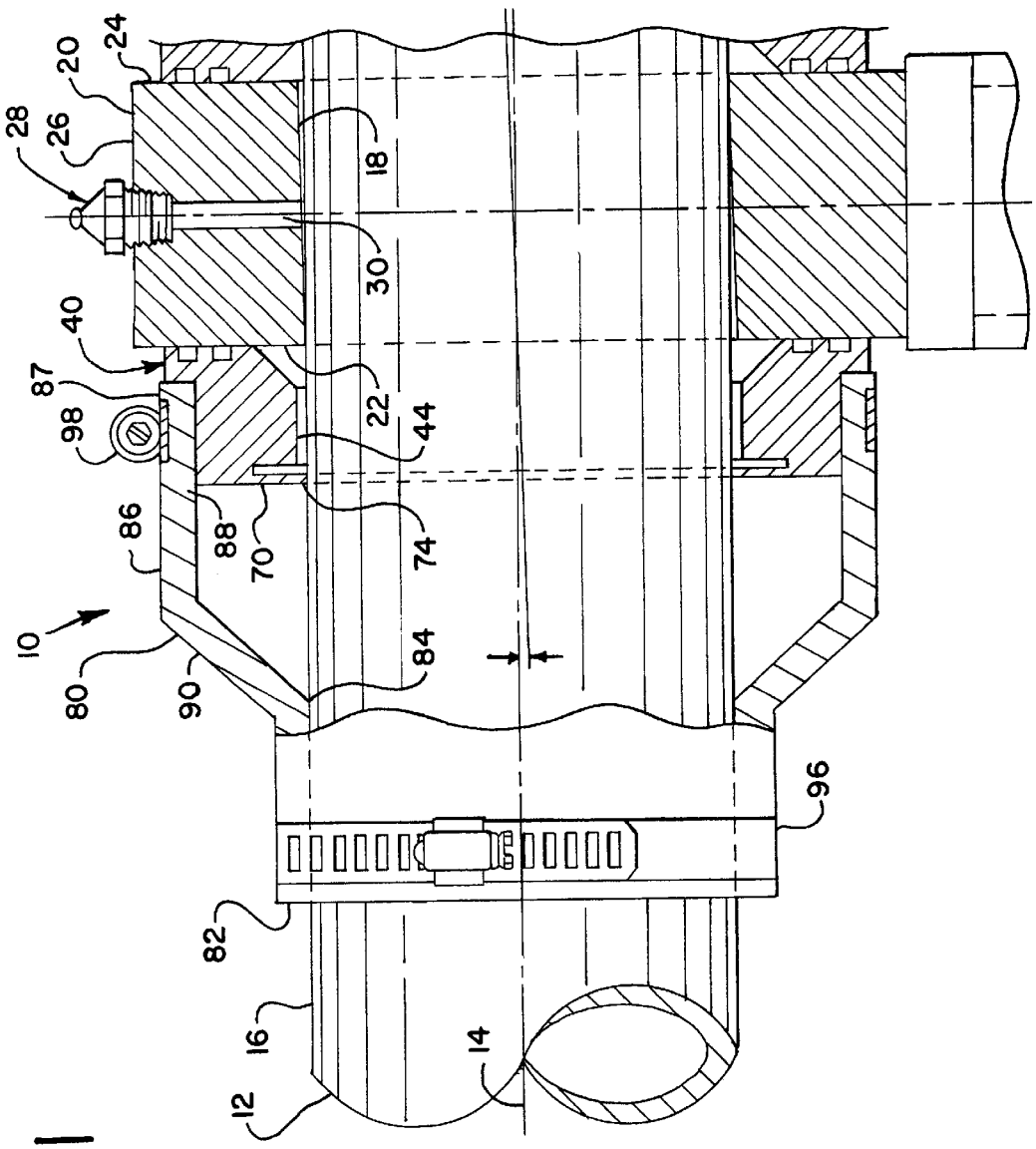
FIG. 1 is a cross-sectional view of the seal device of the present invention shown in connection with a shaft and a bearing member.
Figure 2:
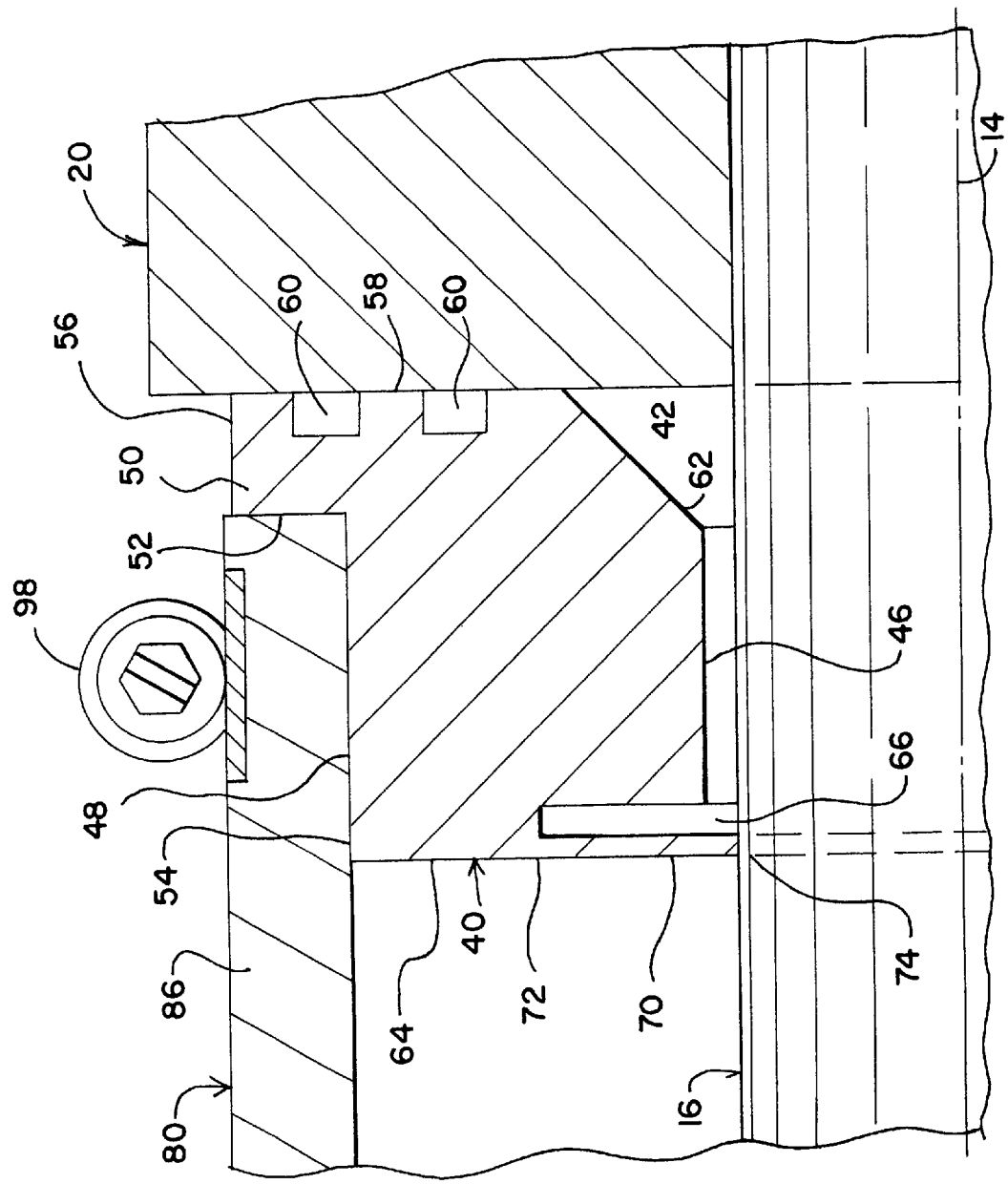
FIG. 2 is a partial cross-sectional view of the seal member of the seal device.

The seal device 10 of the present invention is shown in FIG. 1 in connection with an elongate and generally cylindrical shaft 12 having a central longitudinal axis 14 and a generally cylindrical outer surface 16. The shaft 12 extends through a bore 18 in a stationary member 20 such as a bearing or a gland. The stationary member 20 includes a generally planar and annular first side wall 22 and a spaced apart generally planar and annular second side wall 24. The first and second side walls 22 and 24 are connected by a generally cylindrical peripheral wall 26. The stationary member 20 also includes a grease fitting 28 and a passage 30 extending from the grease fitting 28 to the bore 18. The shaft 12 may be stationary or it may be rotatable about the longitudinal axis 14. The seal device 10 includes a seal member 40, referred to as the AMTITE seal. The seal member 40, as best shown in FIGS. 1 and 2, includes an annular body 42 having a central bore 44 that forms an inner cylindrical wall 46. The body 42 of the seal member 40 also includes an outer generally cylindrical wall 48 that is generally concentric about the inner wall 46. The body 42 includes an outwardly extending projection 50 having an inner side wall 52 that intersects the outer wall 48 at a generally right angle. The outer wall 48 and the inner side wall 52 form a generally circular groove 54 that extends around the body 42. The projection 50 also includes an outer generally cylindrical surface 56. The body 42 of the seal member 40 also includes a sealing surface 58 that may include one or more generally circular and concentric grooves 60. The sealing surface 58 is generally perpendicular to the inner wall 46 and is connected thereto by a wall 62 that is disposed at an approximate angle of forty-five degrees to the inner wall 46 and the sealing surface 58. The sealing surface 68 is adapted to sealingly engage the first side wall 22 of the stationary member 20.

The body 42 also includes a side wall 64 that is generally parallel to and spaced apart from the sealing surface 58. A generally circular groove 66 extends inwardly into the body 42 from the inner wall 46 adjacent to and spaced apart from the side wall 64. The groove 66 forms a generally circular and annular flexible finger seal member 70 having a base 72 and a circular peripheral tip 74 forming a generally circular aperture. The finger 70 includes generally planar and parallel interior and exterior surfaces that extend from the base 72 to the tip 74. The finger 70 has an elongate length extending from the base 72 to the tip 74. The tip 74 extends inwardly from the base 72 and the inner wall 46 beyond the inner wall 46 such that the diameter of the finger 70 at its tip 74 is smaller than the diameter of the inner wall 46. The body 42 of the seal member 40, including the finger 70, is preferably made from a plastic material having a low compressive modulus of elasticity and a high wear rate. One such plastic is ultra high molecular weight (UHMW) polyethylene. When the seal member 40 is used in connection with high speed or high load conditions, only the flexible finger 70 may be made of flexible plastic material, while the remainder of the seal member 40, particularly the sealing surface 58, may be made from heat and wear resistant metals or plastics.

As shown in FIG. 1, the tip 74 of the flexible finger 70 is adapted to sealingly engage the outer surface 16 of the shaft 12 in static engagement. If the shaft 12 is misaligned with the seal member 40, the flexible finger 70 will adopt a wave contact pattern with the outer surface 16 of the shaft 12 to maintain sealing engagement between the finger 70 and the shaft 12 around the entire perimeter of the outer surface 16.

As shown in FIG. 1, the seal device 10 may include a compression coupling member 80 that is adapted to couple the seal member 40 to the shaft 12 and to press the seal member 40 into biased rotational engagement with the stationary member 20. The coupling member 80 includes a first generally cylindrical collar 82 having a generally cylindrical bore 84 and a second cylindrical collar 86 having a generally cylindrical bore 88. The second collar 86 is attached to the first collar 82 by a conical wall member 90. The bore 88 of the second collar 86 has a larger diameter than the diameter of the bore 84 of the first collar 82. The bore 84 of the first collar 82 is adapted to fit relatively closely around the outer surface 16 of the shaft 12.

A first screw clamp 96, preferably made from stainless steel, extends around the end of the first collar 82 and compresses the first collar 82 into sealing engagement with the shaft 12 around the entire periphery of the outer surface 16 of the shaft 12. The first screw clamp 96 thereby couples the coupling member 80 to the shaft 12 for conjoint rotation with the shaft 12 about the axis 14. An end 87 of the second collar 86 is located in the groove 54 of the seal member 40 in engagement with the outer wall 48 and the inner side wall 52 of the projection 50. The end 87 of the second collar 86 is coupled to the body 42 of the seal member 40 by a second screw clamp 98 that extends around the end 87 of the second collar 86. The coupling member 80 thereby couples the seal member 40 to the shaft 12 for conjoint rotation about the longitudinal axis 14. The coupling member 80 is preferably made from a resilient and flexible elastomeric material such as polyvinyl chloride (PVC). The coupling member 80 is resiliently flexible such that it may provide a biasing force to the seal member 40 in a direction generally parallel to the longitudinal axis 14 of the shaft 12 to bias the sealing surface 58 of the seal member 40 into sealing engagement with the stationary member 20. The seal member 40 and the coupling member 80 may respectively be formed in a solid construction or a split construction as desired. When provided in a split construction, the edges of the coupling 80 may be reconnected with an adhesive.

Figure 3:
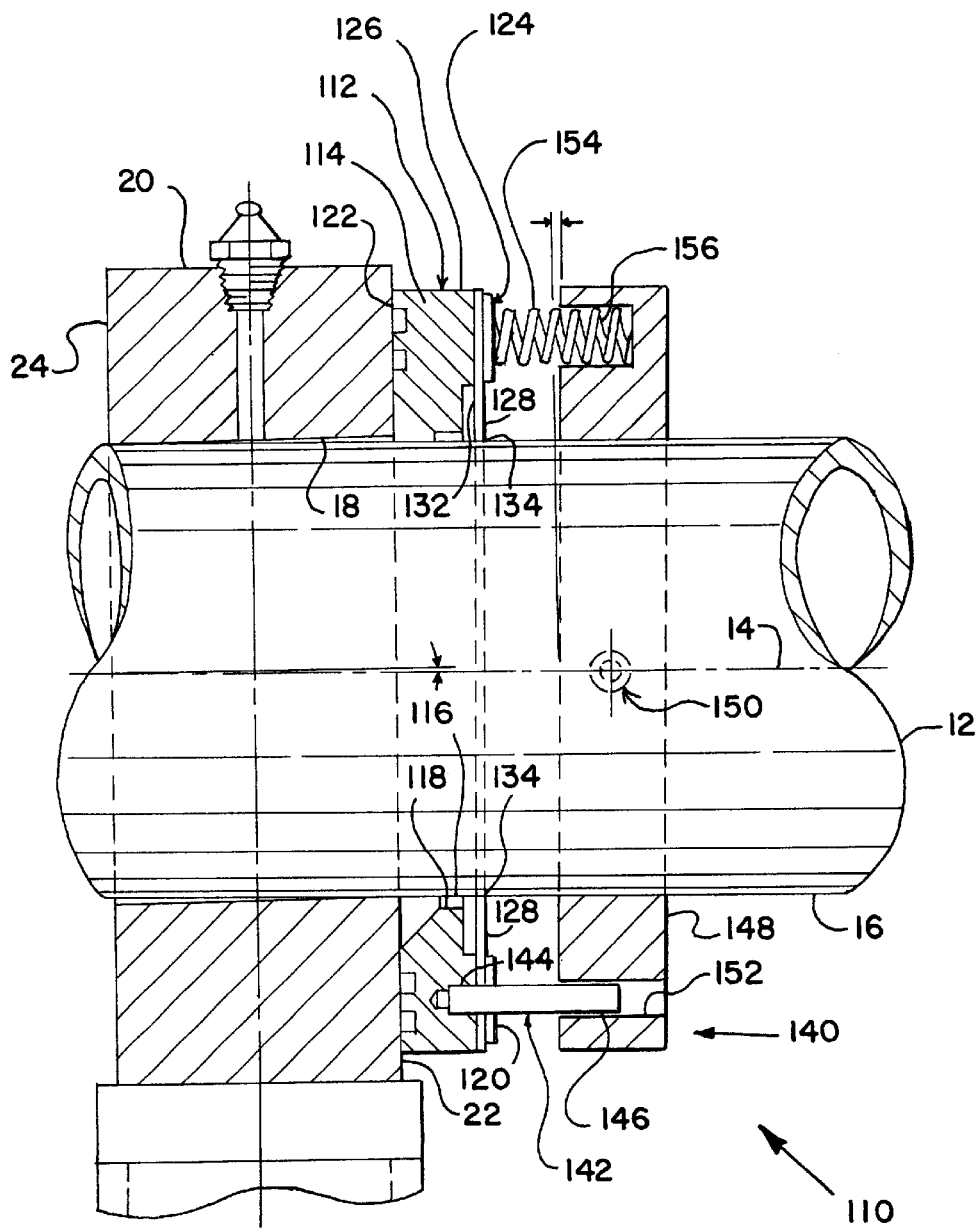
FIG. 3 is a cross-sectional view of another embodiment of the seal device of the present invention.

A modified embodiment of the seal device of the present invention is shown in FIG. 3 and is designated with the reference number 110. The seal device 110 includes a seal member 112 having a body 114. The body 114 includes a generally cylindrical bore 116. The bore 116 forms a generally cylindrical inner wall 118 through which the shaft 12 extends. The body 114 also includes a sealing surface 120 that extends generally perpendicular and outwardly from the inner wall 118. The sealing surface 120 is adapted to sealingly engage the first side wall 22 of the stationary member 20. Alternatively, the sealing surface 120 may include a wear member 122 made from a wear resistant material that is adapted to sealingly engage the first side wall 22 of the stationary member 20. The body 114 also includes a side wall 124 that is generally parallel to and spaced apart from the sealing surface 120, and a generally cylindrical outer wall 126.

A groove 128 extends inwardly into the body 114 from the inner wall 118 to form a generally annular and circular flexible finger seal member 130. The finger 130 includes a base 132 connected to the body 114 and a generally circular peripheral tip 134. The finger 130 includes generally planar and parallel interior and exterior surfaces that extend from the base 132 to the tip 134. The tip 134 of the finger 130 extends beyond the inner wall 118 such that the diameter of the finger 130 at the tip 134 is smaller than the diameter of the inner wall 118. The tip 134 of the finger 130 is adapted to sealingly engage the outer surface 16 of the shaft 12.

The sealing device 110 also includes a compression coupling member 140. The compression coupling member 140 includes a plurality of generally cylindrical pins 142. Each pin 142 includes a first end 144 that is connected to the body 114 of the seal member 112 and a second end 146. The pins 142 are disposed generally parallel to the shaft 12 and are located concentrically around the shaft 12. A stop collar 148 is adapted to extend around the shaft 12 and to be coupled to the outer surface 16 of the shaft 12 by one or more selectively releasable locking devices 150 such as set screws, hose clamps or the like. The locking devices 150 thereby couple the stop collar 148 to the shaft 12 for conjoint rotation therewith. The stop collar 148 includes a plurality of bores 152 extending through the stop collar 148. The second end 146 of each pin 142 is adapted to be located within a respective bore 152 such that the pin 142 is longitudinally slidable within the bore 152. One or more biasing members 154, such as a compression springs, pistons or bellows, extend between the side wall 124 of the seal member 112 and the stop collar 148. Each biasing member 154 may be adapted to extend around a respective pin 142. Alternatively, one end of each biasing member 154 may be connected to the seal member 112 with the other end of the biasing member 154 located within a respective recess 156 formed in a side wall of the stop collar 148.

The pins 142 maintain the biasing members 154 in a proper orientation. The pins 142 rotationally couple the body 114 of the seal member 112 to the stop collar 148 and thereby to the shaft 12 for conjoint rotation. The biasing members 154 resiliently bias the sealing surface 120 or the wear member 122 into sealing engagement with the first side wall 22 of the stationary member 20. The pins 142 maintain proper alignment of the seal member 112 with the shaft 12 and the stationary member 20.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A seal device for creating a seal between a rotatable shaft and a stationary member, said seal device including:
a seal member including a generally annular body having a first end and a second end, said body including a generally cylindrical inner wall forming a bore that extends through said body from said first end to said second end, a sealing surface at said first end adapted to rotatably and sealingly engage the stationary member, and a generally annular flexible finger seal member having a base attached to said body and a generally circular peripheral tip, said finger seal member extending generally radially inwardly from said base to said tip, said tip of said finger seal member defining an aperture, said body including a generally circular groove that extends into said body from said inner wall, said finger seal member being spaced apart from said inner wall by said groove, said bore of said seal member and said aperture of said finger seal member adapted to receive the shaft such that said tip of said finger seal member is in sealing engagement with the shaft.

2. The seal device of claim 1 wherein said sealing surface of said body includes a plurality of generally circular grooves extending around said bore, said grooves being located generally concentrically with respect to one another.

3. The seal device of claim 1 wherein said body includes a side wall at said second end of said body, said base of said finger seal member being located at said side wall adjacent an inner end of said groove, said finger seal member including an exterior surface extending between said base and said tip, said interior surface being generally coplanar with said side wall.

4. The seal device of claim 1 wherein said finger seal member is generally sheet-like having a generally planar interior surface and a generally planar exterior surface extending from said base to said tip, said interior and exterior surfaces being generally parallel to one another.

5. The seal device of claim 1 wherein said tip of said finger seal member is located inwardly toward the center of said body with respect to said inner wall of said body.

6. The seal device of claim 1 including a coupling member having a first end and a second end, a first collar at said first end of said coupling member adapted to be attached to said body of said seal member, and a second collar at said second end of said coupling member adapted to be coupled to the shaft for conjoint rotation with the shaft.

7. The seal device of claim 6 wherein said coupling member is formed from a resilient flexible material.

8. The seal device of claim 6 including a first clamp for coupling said first collar of said coupling member to said seal member and a second clamp for coupling said second collar of said coupling member to the shaft, whereby said seal member and said coupling member are conjointly rotatable with the shaft.

9. The seal device of claim 8 wherein said body of said seal member includes an outer wall that extends around said inner wall, said first collar of said coupling member extending around said outer wall.

10. The seal device of claim 9 wherein said body of said seal member includes a projection at said first end of said body that projects outwardly from said outer wall, said projection including a generally annular inner side wall, said first collar of said coupling member engaging said inner side wall of said projection.

11. The seal device of claim 1 including a coupling member adapted to be attached to the shaft for conjoint rotation with the shaft, and a plurality of pins extending between said coupling member and said seal member, said pins rotationally coupling said seal member to said coupling member.

12. The seal device of claim 11 wherein said coupling member includes a plurality of bores, each said pin being slidably located within a respective bore.

13. The seal device of claim 11 including a plurality of biasing members extending between said coupling member and said seal member, said biasing members adapted to resiliently bias said sealing surface of said seal member into engagement with the stationary member.

14. The seal device of claim 13 wherein each said biasing member comprises a spring.

\* \* \* \* \*